US012592045B2

(12) United States Patent
Strachan

(10) Patent No.: US 12,592,045 B2
(45) Date of Patent: *Mar. 31, 2026

(54) AUGMENTED REALITY SYSTEM AND METHOD

(71) Applicant: Mark Strachan, Westlake Village, CA (US)

(72) Inventor: Mark Strachan, Westlake Village, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 18/378,996

(22) Filed: Oct. 11, 2023

(65) Prior Publication Data

US 2024/0046585 A1 Feb. 8, 2024

Related U.S. Application Data

(63) Continuation-in-part of application No. 17/187,818, filed on Feb. 28, 2021, now Pat. No. 11,798,236.

(60) Provisional application No. 62/983,429, filed on Feb. 28, 2020.

(51) Int. Cl.
| | |
|---|---|
| *G06T 19/00* | (2011.01) |
| *G06F 3/0346* | (2013.01) |
| *G06F 3/04815* | (2022.01) |
| *G10H 1/00* | (2006.01) |

(52) U.S. Cl.
CPC .......... *G06T 19/006* (2013.01); *G06F 3/0346* (2013.01); *G06F 3/04815* (2013.01); *G10H 1/0008* (2013.01); *G06T 2200/24* (2013.01); *G10H 2220/131* (2013.01); *G10H 2220/401* (2013.01)

(58) Field of Classification Search
CPC ... G06T 19/006; G06T 2200/24; G06F 3/011; G06F 3/0346; G06F 3/04815; G06F 3/04842; G10H 2220/131; G10H 401/401
See application file for complete search history.

(56) References Cited

U.S. PATENT DOCUMENTS

| | | | |
|---|---|---|---|
| 8,653,349 B1 * | 2/2014 | White | G10H 1/0025 |
| | | | 84/625 |
| 8,854,470 B2 | 10/2014 | Park et al. | |
| 9,679,547 B1 | 6/2017 | Zund et al. | |
| 9,788,714 B2 | 10/2017 | Krueger | |
| 10,078,917 B1 | 9/2018 | Gaeta et al. | |
| 10,169,924 B2 | 1/2019 | Rosenthal et al. | |
| 10,231,614 B2 | 3/2019 | Krueger | |
| 10,565,796 B2 | 2/2020 | Hagbi et al. | |
| 11,798,236 B2 * | 10/2023 | Strachan | G06F 3/04815 |
| 2005/0190199 A1 | 9/2005 | Brown et al. | |

(Continued)

FOREIGN PATENT DOCUMENTS

| | | | | |
|---|---|---|---|---|
| CN | 110910712 A | * | 3/2020 | G09B 15/06 |
| KR | 101679239 B1 | * | 11/2016 | G10H 1/24 |

*Primary Examiner* — Chante E Harrison
(74) *Attorney, Agent, or Firm* — Paul D. Chancellor; Ocean Law

(57) ABSTRACT

Augmented reality is used to visualize virtual objects and their relationship such as musical notes or groups of musical notes using for example a display proximate a user's eyes, for example where images in the display appear to be in a space in front of or around the user, for example where the images in the display are for manipulation by an augmented reality controller, for example where the augmented reality controller is held by the user.

5 Claims, 4 Drawing Sheets

(56)          References Cited

U.S. PATENT DOCUMENTS

| | | | |
|---|---|---|---|
| 2006/0156906 A1* | 7/2006 | Haeker | G10H 1/0066 |
| | | | 84/609 |
| 2008/0271591 A1 | 11/2008 | Lemons | |
| 2013/0220101 A1* | 8/2013 | Lemons | G09B 15/026 |
| | | | 84/483.2 |
| 2023/0154445 A1* | 5/2023 | Bauer | G06F 3/03547 |
| | | | 84/609 |

* cited by examiner

AUGMENTED REALITY SYSTEM AND METHOD

PRIORITY CLAIM AND INCORPORATION BY REFERENCE

This application is a continuation-in-part of U.S. patent application Ser. No. 17/187,818 filed Feb. 28, 2021 titled AUGMENTED REALITY SYSTEM AND METHOD. This application claims the benefit of U.S. Prov. Pat. App. No. 62/983,429 filed Feb. 28, 2020 titled AUGMENTED REALITY SYSTEM AND METHOD. This application incorporates by reference in their entireties and for all purposes U.S. Pat. Nos. 8,854,470, 9,788,714, 10,078,917, 10,169,924, 10,231,614, and 10,565,796.

BACKGROUND OF THE INVENTION

Field of the Invention

The invention relates to the field of manufactured computing devices. More particularly, the present invention relates to computing devices, software, and displays for presenting scenes akin to but different from reality.

Description of the Related Art

Augmented reality typically blends interactive digital elements into real-world environments. Applications include navigation systems superimposing a route over the live view of the road, sports presentations where lines dawn on the field illustrate and analyze plays, and aircraft pilots who see aircraft data on their helmet visor.

SUMMARY OF THE INVENTION

Augmented reality systems have uses including visualization of objects and collections of objects such as musical notes and collections of musical notes. Augmented reality displays include virtual displays and virtual/real displays.

In an embodiment, an augmented reality system comprises one or more of transducers, a processor, a display, software & data storage, and an augmented reality controller. These devices may be interconnected and may provide augmented reality displays of tangible and intangible items. Transducers may include any of motion, position, relative position, inertial, speed, acceleration, jerk, and attitude sensors or transducers.

For example, an embodiment provides an augmented reality process comprising: an octave of musical notes selected by a user; the octave traversing a single loop; a prompt to place the loop or coil in a particular position; wherein 12 tetrads form a coil around the position such that the user may walk around with an outstretched arm holding an augmented reality controller allowing them to either roll over or select a tetrahedron. In an embodiment, an augmented reality system comprising: a display proximate a user's eyes, images in the display appearing to be in a space in front of or around the user, the images in the display for manipulation by an augmented reality controller held by the user; in the display, an image of an octave of musical notes selected by a user; the notes laid out in sequence along a spiral path; and, the notes depicted by tetrahedrons that point in a direction along a spiral path of increasing frequency; a tetrahedron color that indicates a distance from a chosen root note of a musical scale; wherein the user walks around with an outstretched arm holding the augmented reality controller and manipulating the augmented reality controller to allow a rolling over or a selection of one or more tetrahedrons. Applicant notes that herein, the word user may be used interchangeably with the word composer.

For example, an embodiment provides an augmented reality process comprising the steps of: in a 3D augmented reality space, setting up a 1st coil with N first spaced virtual objects thereon; in an addition step, adding a 2nd smaller coil with N second spaced virtual objects such that each of the first spaced virtual objects is a center for a respective second coil that is arranged orthogonally with respect to the first coil; for additional coils with spaced virtual objects, repeating the addition step one or more times such that a total of three or more coils with spaced virtual objects result; selecting a virtual object of interest on a Kth coil where $2<=K<=N$; displaying to a user only (1) the Kth coil with its virtual objects and (2) any larger coils with their virtual objects; and, wherein selection of the virtual object of interest may also select the virtual objects on the larger coils that provide centers.

For example, an embodiment provides an augmented reality system comprising: an octave of musical notes selected by a user; a processor communicating with an augmented reality controller and a display; the octave traverses a single loop or single open loop; a prompt to place the loop in a particular position; 12 tetrahedrons spaced apart on the loop indicate the musical notes of the octave; and, at least one axis of the tetrahedron used as a pointer; a tetrahedron color that indicates a distance from a chosen root note of a musical scale; wherein the user walks around with an outstretched arm holding an augmented reality controller allowing them to either roll over or select a displayed tetrahedron.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENT

The present invention involving augmented reality ("AR") is described with reference to the accompanying figures. These figures, incorporated herein and forming part of the specification, illustrate the present invention and, together with the description, further serve to explain the principles of the invention and to enable a person skilled in the relevant art to make and use the invention.

Figure 1:
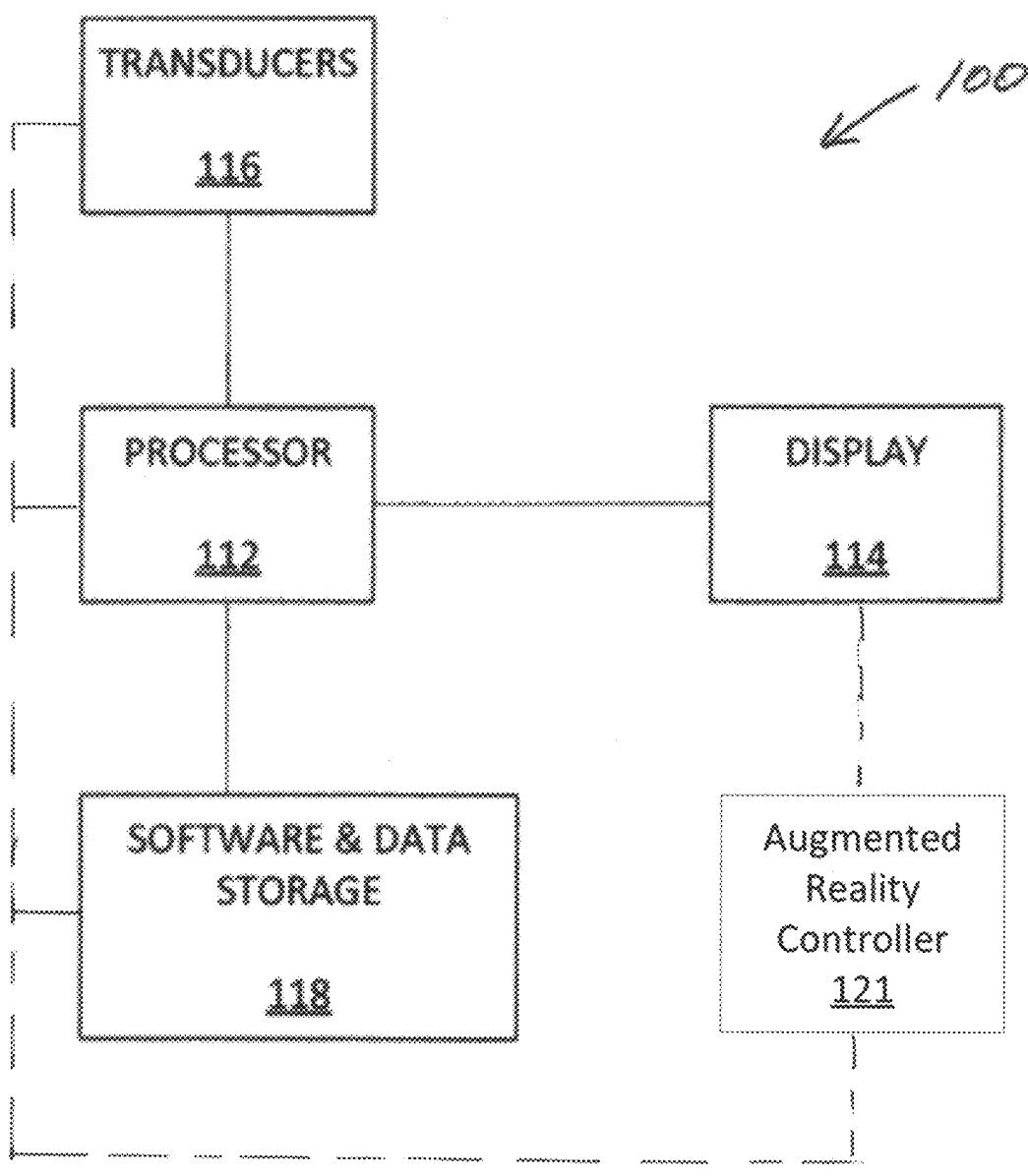
FIG. 1 shows an augmented reality system in accordance with the present invention.

FIG. 1 shows an augmented reality system 100. A processor 112 running augmented reality software and accessing data 118 receives environmental signals and inputs from transducers 116 and signals form an augmented reality controller 121 in order to produce in a display 114 real or altered versions of visualized reality and/or virtual elements or objects.

In one or more embodiments, the transducers 116 may be included with, attached to, exchanging signals with, or integral with any other component of the augmented reality system such as the processor 112, augmented reality controller 121, or display 114.

In one or more embodiments the display 114 may be included with, attached to, exchanging signals with, or integral with any other component of the augmented reality system such as the processor 112, augmented reality controller 121, or transducers 116.

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed invention.

In various embodiments, the augmented reality controller 121 may exchange signals or data with any other component of the augmented reality system including the transducers 116, processor 112, software and data storage 118, and display 114. For example, the augmented reality controller may communicate with any one or more of these components to position, change, order, or serve up images, portions of images, caricatures, objects, or decorations.

In various embodiments, the augmented reality controller 121 may be hand-held by a user or composer. The augmented reality controller may be operated by a composer and may provide or exchange signals to/with the processor 112 enabling the display of composed musical notes which may be added to, rearranged, or changed at will by the composer.

Example Of Augmented Reality Multi-Dimensional Multi Select

Embodiments of the invention which may be implemented in software or hardware allow the user to represent multiple dimensions of a discrete range of numbers and to quickly select an ordered list of elements each of which is a coordinate in the space spanned by the dimensions. Spatial reorganization may be used to prioritize access to important information within the space. The user may annotate the data with graphic decorators that assist the user with decisions concerning selection of the ordered list of elements.

Embodiments of the invention which may be implemented in software or hardware allow the user to represent multiple aspects or dimensions of a particular range of identifiers and to select one or more lists or particular/ordered/related lists of elements or objects each of which is a location or coordinate in the space spanned. Spatial reorganization may be used to order objects in a manner assists with understanding and/or prioritizes access to important information within the space. The user may annotate data or objects with graphic symbols and/or decorations that assist the user with relating or ordering objects or elements.

Example Involving Musical Note Selection

In an embodiment, the invention allows composers to compose an original musical composition, for example using augmented reality to display the composed musical notes. Here, the composer may select each note. In some embodiments these selections are guided by the visualizations made possible by augmented reality. Because creation of musical notes is the object of these embodiments, no music input music and no sound wave input is available from which musical notes can be identified.

In an embodiment of the invention, the user selects musical notes within an octave of musical notes. In further embodiments of the invention, any range of discrete values can be represented, for example, by the 12 notes of a musical octave.

Figure 2A:
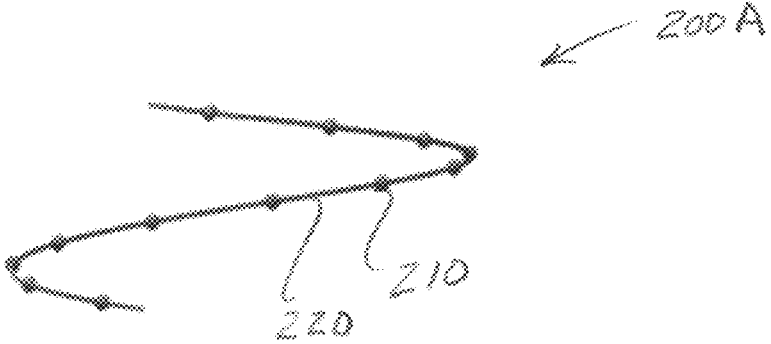
FIG. 2A shows musical notes on a loop or spiral.
Figure 2A:

In FIG. 2A, a spiral 200A is shown. Here, musical notes 210 or a single dimension of musical notes warps the octave into a single loop or spiral 220. The loop may connect as a circle, or may be broken with vertical displacement, creating a single winding of a spiral.

Figure 2B:
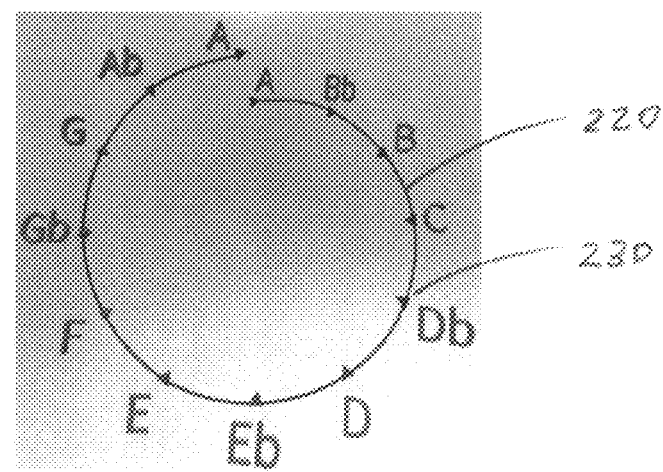
FIG. 2B shows particular musical notes on a loop or spiral where moving from the lower note A to the upper note A is a doubling of frequency.

In FIG. 2B, a spiral with particular notes is shown 200B. Here, specific values 230 (e.g., notes) are chosen along the continuous loop to present values for selection.

Figure 2C:
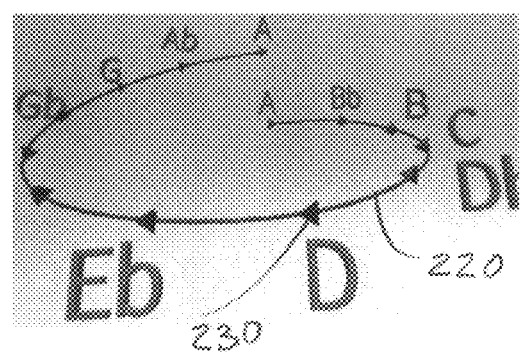
FIG. 2C shows tetrahedrons at note locations on a loop or spiral.

In FIG. 2C, a spiral of notes indicated by tetrahedrons is shown 200C. Here, specific values may be represented by a graphical element such as a tetrahedron 230 which can be drawn with 4 flat triangles.

Figure 2D:
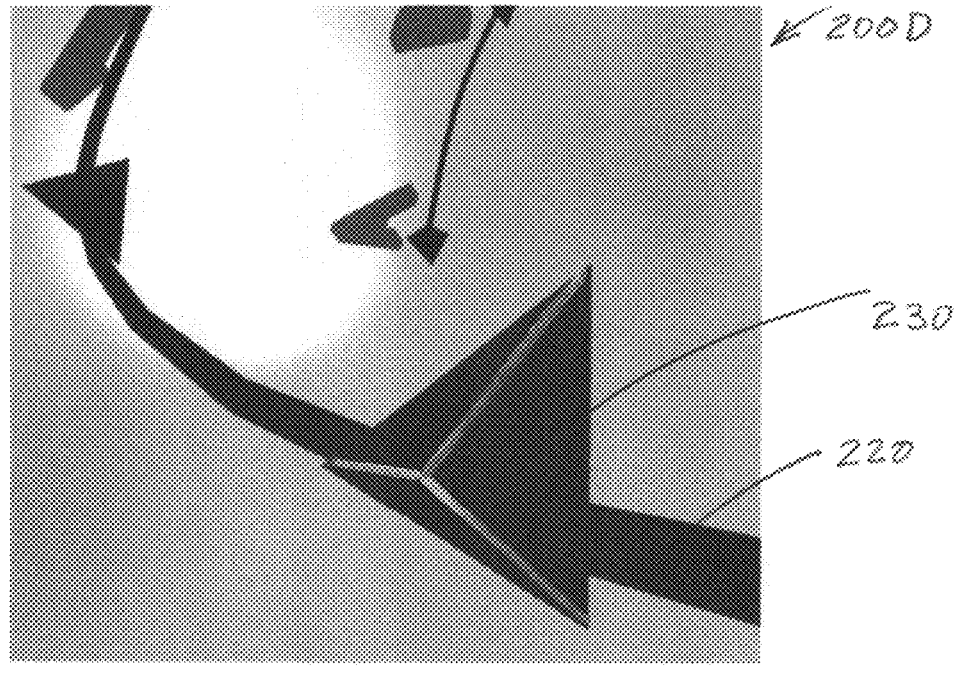
FIG. 2D shows a particular tetrahedron at a note location on a loop or spiral.

In FIG. 2D, a tetrahedron 230 marking a particular location is shown 200D. The tetrahedron can be oriented such that it has axes used as pointers and perceivable by the user which can indicate orientation.

Figure 2E:
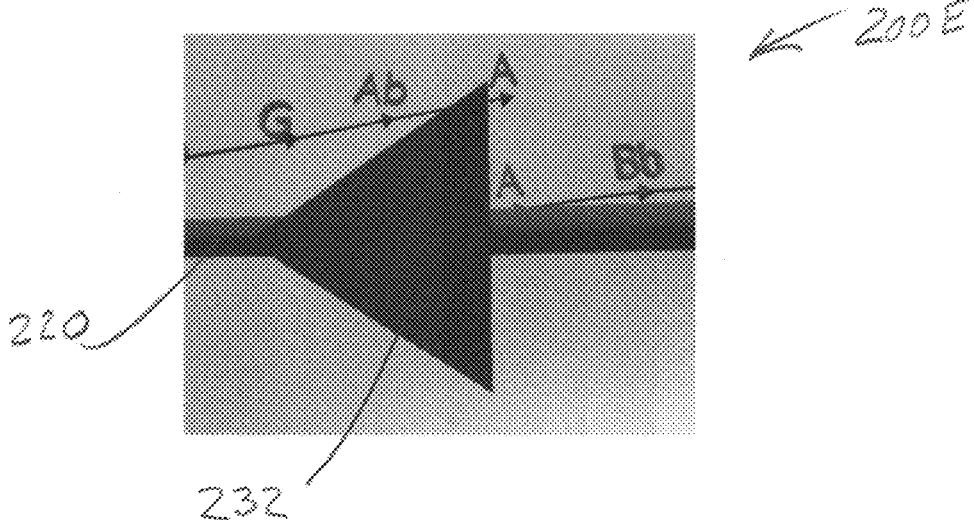
FIG. 2E shows a tetrahedron at a note location on a loop or spiral pointed to the left.

In FIG. 2E, a first tetrahedron pointer is shown 200E. In this side view, the tetrahedron 232 points to the left to higher frequencies.

Figure 2F:
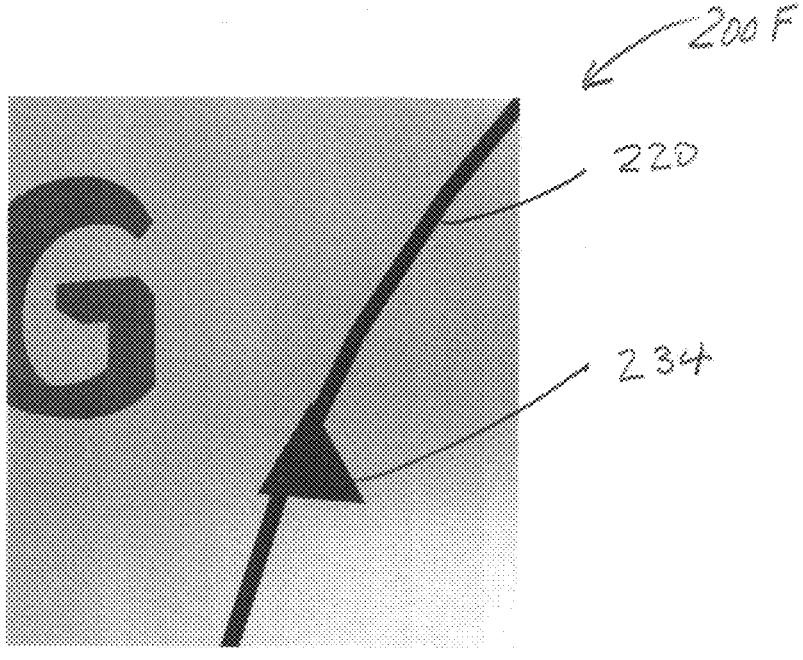
FIG. 2F shows a tetrahedron at a note location on a loop or spiral pointed upwards.

In FIG. 2F, a second tetrahedron pointer is shown 200F. In this view from above, the tetrahedron 234 points upward to higher frequencies.

In various embodiments, the tetrahedrons are assigned a color. In the case of musical notes, the chosen coloration indicates a distance from a chosen 'root' note of a musical scale. Thus, the color describes the interval distance from the root note of a scale. When the root changes, the selected color changes.

Example Of Space Configuration

When a user selects multi-dimensional multi select, they are prompted to place the first-dimension loop or coil. This places 12 tetrads in a coil around the position selected by the user. The user may then walk around, with an outstretched arm, holding an augmented reality controller or hand representation that allows them to either roll over or select a tetrahedron. During a roll-over, the user may 'audition' the data associated with the tetrahedron selected by the rollover.

Example Of Path Selection

Where a user 'selects' a particular shape, for example a tetrahedron and for example using an event from a controller or hand gesture, the system will draw a highlight sphere over the tetrahedron to indicate it is selected. If prior objects have been selected, the system will draw a line segment from the previously selected object to the newly selected object. The line segment may be tapered, to imply direction. Additionally, the line segment may be decorated with colors to convey additional information to the user regarding the differences between the previously and newly selected objects.

Example Of Additional Dimensions

Once a single dimension of objects has been set up in the AR space, a new dimension may be added, by centering a new coil around each existing tetrahedron and by drawing a new coil around each existing tetrahedron. These new coils will be oriented orthogonally to the original coil. This has the effect of orienting the new tetrads as if they are painted around the surface of a torus like shape, given that the torus may not have a closed surface, due to the open ends of the coils. This process may be repeated for an arbitrary number of dimensions. With each additional dimension applied, the total number of tetrahedrons increases by a factor of 12. The scale of each additional dimension, as represented in the 3 dimensions of augmented reality, necessarily gets smaller with each new dimension. In order for the user to browse smaller and smaller dimensions, the system provides them with the ability to zoom in. When an element is selected in a 'smaller' dimension, also selected are elements in all larger dimensions that correspond to that coordinate. This means that selection of a single tetrahedron indicates selection of a set of coordinates, thus allowing the user to simultaneously select n notes in n multiple dimensions, which provides provably faster selection than selection of a single number n times in n multiple dimensions.

Example Of Space Warping and Selection Support Tools

The system provides tools to 'warp' the space to make decision and selection tasks easier, simpler and more efficient. In an embodiment of the invention, the user has 6 dimensions actively represented. In the first embodiment, the user may select the center tetrad for dimension 4, and locally expand dimensions 5 and 6 for that object, enabling selection of elements from dimensions 5 and 6. The system shall also provide the user with tools to filter the complete set of tetrahedrons, to simplify selection. In the first embodiment of the invention, the user can filter all dimensions by 'musical key.' This removes elements from each coil in the application. Where dimensions are nested and the central supporting tetrahedron is turned off, the entire sets of lower dimensions are also removed. This enables the filters to be applied selectively to make the general space sparsely populated with notes that are 'in key' notes.

Further and other embodiments of augmented reality allow for additional warping and filtering mechanisms to be applied to the selection space. The system may decorate tetrahedrons with additional information using shaders or additional mesh driven augmented reality objects that enable users to make better informed decisions about tetrahedrons. This can include, for example, color associations for groups of tetrahedrons across dimensions, like triad coloration over the third dimension. Other shapes can be applied to the space like note names, and guide paths that show organizing information in the selection space for decision support.

Example Involving Implications of Paths

The system may both allow the user to select a sequence of elements in the space (representing harmonic and melodic sequences) and may also draw sequences for the user illustrating mathematical properties of the selection space.

This can further guide the user in their selection choices. For example, the system can annotate a library of chords for a given root note by drawing paths that show the relationships and grouping of the chords. If all chords are drawn for a given root note, these can all appear in 1 ring of a torus. These chord libraries can be replicated for all root notes and thus can appear distributed around the entire selection space. Other paths can be drawn. These include libraries of keys, chord progressions like the set of all major chord progressions, the set of all minor chord progressions, and any piece of music with any number of voices.

Example Involving Positive and Negative Selection Space

The space may be used as a positive selection space (i.e. a set of objects that are present in a larger set) or a negative selection space (i.e. a selection of objects that are to be removed from a space). Use of the space as a negative selection space can enable a limited number of dimensions to be used as a selection tool for a larger mathematical space.

Exemplary Accessories

Additional user interfaces may work in conjunction with the selection space. In the current embodiment this includes a grid control to assign an octave number to each voice. This also includes switches for clearing key, changing mode, and changing root. Switch states are combined to specialize the configuration of the space to aid in user decision support.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An augmented reality process comprising the steps of:

providing augmented reality system components including transducers receiving signals including environmental signals, a processor, software and data storage, a display, and a hand-held augmented reality controller;

displaying to a single user a 3D augmented reality space including a view of a real-world environment;

in the 3D augmented reality space in a first step, setting up a 1st coil with N first spaced apart virtual objects thereon;

in the 3D augmented reality space in an addition step, adding a 2nd smaller coil with N second spaced virtual objects such that each of the first spaced virtual objects is a center for a respective second coil that is arranged orthogonally with respect to the first coil;

for additional coils with spaced virtual objects, repeating the addition step two or more times such that a total of four or more coils with spaced virtual objects result;

selecting a virtual object of interest on a Kth coil where 2<=K<=N;

limiting the coils displayed to the user to (1) the Kth coil with its virtual objects and (2) any larger coils with their virtual objects; and, wherein selection of the virtual object of interest also selects the virtual objects on the larger coils that provide centers.

2. The augmented reality process of claim 1 wherein each coil represents N=12 musical notes selected by a composer composing an original work.

3. An augmented reality system comprising:

an octave of musical notes selected by a composer where the source of the musical notes is not live or recorded music;

a processor communicating with an augmented reality controller, plural transducers, and a video display for composing music;

the octave traverses a single loop or a single open loop;

a prompt to display the loop in a particular position;

tetrahedrons spaced apart along the loop indicate musical notes of the octave;

at least one axis of one of the tetrahedrons used as a pointer; and, at least one tetrahedron bearing a color that indicates a distance from a chosen root note of a musical scale;

wherein the composer walks around holding the augmented reality controller which allows the composer to roll over or select a displayed tetrahedron.

4. The augmented reality system of claim 3 wherein the video display is included with the augmented reality controller.

5. The augmented reality system of claim 4 wherein navigation among the musical notes is via the augmented reality controller and one or more of the transducers included therewith.

* * * * *